(12) United States Patent
Moravec et al.

(10) Patent No.: US 7,152,635 B2
(45) Date of Patent: Dec. 26, 2006

(54) COMMERCIAL AIRCRAFT ON-BOARD INERTING SYSTEM

(75) Inventors: Bradford L. Moravec, Kirkland, WA (US); Royal E. Boggs, Kirkland, WA (US); Rodney N. Graham, Issaquah, WA (US); Alan Grim, Lake Stevens, WA (US); David A. Adkins, Bothell, WA (US); Donald Snow, Jr., Fountain Valley, CA (US); Greg A. Haack, Signal Hill, CA (US)

(73) Assignee: The Boeing Company, Chicago, IL (US)

( * ) Notice: Subject to any disclaimer, the term of this patent is extended or adjusted under 35 U.S.C. 154(b) by 31 days.

(21) Appl. No.: 10/708,110

(22) Filed: Feb. 10, 2004

(65) Prior Publication Data

US 2005/0173017 A1   Aug. 11, 2005

(51) Int. Cl.
   *B65B 31/04* (2006.01)

(52) U.S. Cl. .................... 141/64; 141/66; 141/94; 141/82; 244/135 R

(58) Field of Classification Search ............ 141/1, 141/62, 63, 64, 66, 94, 95, 198, 82; 244/135 R; 96/4–9
See application file for complete search history.

(56) References Cited

U.S. PATENT DOCUMENTS

| | | | |
|---|---|---|---|
| 3,269,801 A | 8/1966 | Boberg et al. | |
| 3,691,730 A * | 9/1972 | Hickey et al. | 96/161 |
| 3,788,039 A * | 1/1974 | Bragg | 96/174 |
| 4,378,920 A | 4/1983 | Runnels et al. | |
| 4,556,180 A | 12/1985 | Manatt | |
| 4,681,602 A * | 7/1987 | Glenn et al. | 95/47 |
| 4,913,380 A * | 4/1990 | Vardaman et al. | 244/135 R |
| 5,069,692 A | 12/1991 | Grennan et al. | |
| 5,143,329 A | 9/1992 | Coffinberry | |
| 5,860,283 A | 1/1999 | Coleman et al. | |
| 6,189,324 B1 | 2/2001 | Williams et al. | |
| 6,729,359 B1 * | 5/2004 | Jones | 141/1 |
| 6,739,359 B1 * | 5/2004 | Jones et al. | 141/64 |
| 2002/0158167 A1 | 10/2002 | Schmutz et al. | |
| 2004/0000353 A1 * | 1/2004 | Jones | 141/64 |
| 2004/0065778 A1 * | 4/2004 | Jones | 244/135 R |
| 2004/0226438 A1 * | 11/2004 | Jones | 95/45 |
| 2005/0115404 A1 * | 6/2005 | Leigh et al. | 95/11 |

FOREIGN PATENT DOCUMENTS

EP   1 108 458 A1   6/2001

OTHER PUBLICATIONS

Author Unknown, "Fluid Thinking for Aerospace —Environmental Control Systems", printed from Internet website: http://www.flowmaster.com/apps/aero_ecs.html, Mar. 10, 2003.

(Continued)

*Primary Examiner*—Steven O. Douglas
(74) *Attorney, Agent, or Firm*—Ostrager Chong Flaherty & Broitman P.C.

(57) ABSTRACT

An inerting system (10) for an aircraft (12) includes one or more fuel tank circuits (15) associated with fuel tanks (16). An air source (17) supplies pressurized air. A heat exchanger (56) cools the pressurized air. An air separation module (46) is in fluid communication with the heat exchanger (56) and separates inerting gas from the pressurized air. A controller (40) controls flow of the inerting gas from the air separation module (46) to the fuel tanks (16).

39 Claims, 2 Drawing Sheets

OTHER PUBLICATIONS

Author Unknown, "Cabin Cooling and Antifog Systems", printed from Internet website: http://www.tpup.com/ase2/62.htm, Mar. 10, 2003.

Author Unknown, "C-17 ASM, Air Seperation Module", printed from Internet website: http://www.littons.com/NitrogenGenSystms/c17asm.html, Mar. 10, 2003.

Product Brochure: Model NC 1069 Air Seperation Module, Northrup Grumman Corporation, 2002.

Federal Aviation Administration, "Onboard Inert Gas Generating System For a 747SP", Feb. 2002.

Aviation Rulemaking Advisory Committee, "Fuel Tank Inerting Harmonization Working Group —Final Report", Jun. 2001, Submitted joint by: AEA, AECMA, AtA, ALPA, API, ATA, FAA, JAA, and NADA/F.

Aviation Rulemaking Advisory Commitee, "Fuel Tank Inerting Harmonization Working Group —Team Reports", Jun. 2001, Appendixes A —D.

* cited by examiner

COMMERCIAL AIRCRAFT ON-BOARD INERTING SYSTEM

BACKGROUND OF INVENTION

The present invention relates generally to aeronautical vehicle fuel tank inerting systems, and more particularly, to a system for inerting fuel tank(s) of a commercial aircraft.

Fuel tanks within wings of an aircraft represent vulnerable areas on all aircraft for the potential for flame initiation due to the existence of fuel vapor and oxygen concentration levels therein. Fuel tank inerting systems are currently used to reduce oxygen concentration levels within fuel tanks of some military aircraft in order to significantly reduce the vulnerability of military aircraft to hostile munitions.

As is known in the art, as oxygen concentration levels within a fuel tank increase, likelihood of flame initiation and propagation and likelihood of a possible explosion also increases. This threat exists since fuel vapors generally mix with ambient air that has a 21% concentration of oxygen. It has been determined that when oxygen concentration levels are maintained at a level of approximately 12% or less at seal level (14.5% at 40,000 ft), that the threat of flame propagation or of an explosion from occurring can be significantly reduced or eliminated.

Some vehicles, principally military vehicles, are equipped with fuel tank inerting systems, which supply nitrogen gas to purge fuel tanks and effectively reduce oxygen concentration levels therein. Of available types of fuel tank inerting systems, the most desirable from a weight, capacity, and ground service requirements stand point is an inert gas generation system that utilizes pressurized air supplied by engine bleed from a gas turbine engine or other airborne source of pressurized air. This air is separated into an oxygen rich component, which is exhausted overboard, and an oxygen depleted or inert gas component, which is fed to the fuel tank.

Unlike military applications, commercial aircraft ignition threat requirements are not as probable, but other requirements, such as reliability, maintenance and cost of internal components and systems can be more stringent. Military inerting systems often utilize complicated and unreliable components to provide nitrogen-enriched air to each wing fuel tank, for all perceivable mission conditions. During combat military missions, threats from hostile munitions are highly probable. The military type systems have a poor reliability history, with high maintenance costs and are oversized for the vast majority of typical commercial aircraft operations.

The primary flammability exposure for current commercial aircraft is in the center fuel tanks, particularly if located adjacent to heat sources. Thus, a primary desire exists in commercial aircraft applications to reduce flammability exposure in center fuel tanks, to a level that is similar to that of the wing fuel tanks. Additionally, reducing exposure in wing fuel tanks can also be desirable when aircraft design characteristics result in high flammability exposure or when additional reduction in wing fuel tank flammability exposure is desired.

Additionally, it is also desirable for the fuel tank to be inert during both ground and flight conditions. The inerting air need be supplied without use of inerting air storage tanks, which can be heavy in weight, as are commonly used in prior art military inerting systems. Further, variations in oxygen concentrations throughout tanks must be minimized to achieve a uniform level of inert content, without over sizing the inerting system.

It is therefore desirable to provide an inerting system that reduces flammability exposure in fuel tanks of a commercial aircraft during both ground and flight conditions, while at the same time minimizing size, weight, maintenance, and cost, as well as maximizing reliability to be effective and feasible for commercial applications.

SUMMARY OF INVENTION

The present invention provides a system and method for supplying inerting gas to one or more fuel tank circuits having fuel tanks and maintaining the tanks in an inert condition during ground and flight conditions of an aircraft. An inerting system is provided and includes one or more fuel tank circuits, each of which associated with a fuel tank. An air source supplies pressurized air. A heat exchanger cools the pressurized air. One or more air separation modules receive cooled air from the heat exchanger and separate inerting gas from the pressurized air. A controller controls flow of the inerting gas from the air separation modules to the fuel tanks.

The embodiments of the present invention provide several advantages. One such advantage is the provision of an inerting system that reduces the flammability of high flammability tanks, such as aircraft center tanks where flammability is generally the highest, thus minimizing system size and weight.

Another advantage provided by an embodiment of the present invention is the provision of an inerting system that maintains the tanks at appropriate inerting levels during aircraft ground operations, without continuously operating the system.

Furthermore, another advantage provided by an embodiment of the present invention is the provision of an inerting system that maintains oxygen content levels within fuel tanks of an aircraft to approximately 12% or less. In so doing, the present invention minimizes weight, size, and cost of an inerting system and provides improved reliability and operational performance.

Yet another advantage provided by an embodiment of the present invention is the provision of producing inerting gas by utilizing bleed air pressure without the additional need for a compressor, thereby further minimizing weight and maximizing the reliability of an inerting system. Note although there is no additional need for a compressor, the stated embodiment may utilize a compressor when desired.

Moreover, another embodiment of the present invention minimizes the quantity of bleed air used during climb and cruise by operating in multiple inerting system modes. The present invention also utilizes an ozone converter to enhance air separation module reliability and life.

In addition, another embodiment utilizes the inerting gas provided to the tanks to supply an ejector that mixes the tank air/vapor volume, which minimizes oxygen content variation throughout the tanks.

The present invention itself, together with further objects and attendant advantages, will be best understood by reference to the following detailed description, taken in conjunction with the accompanying drawing.

DETAILED DESCRIPTION

Figure 1:
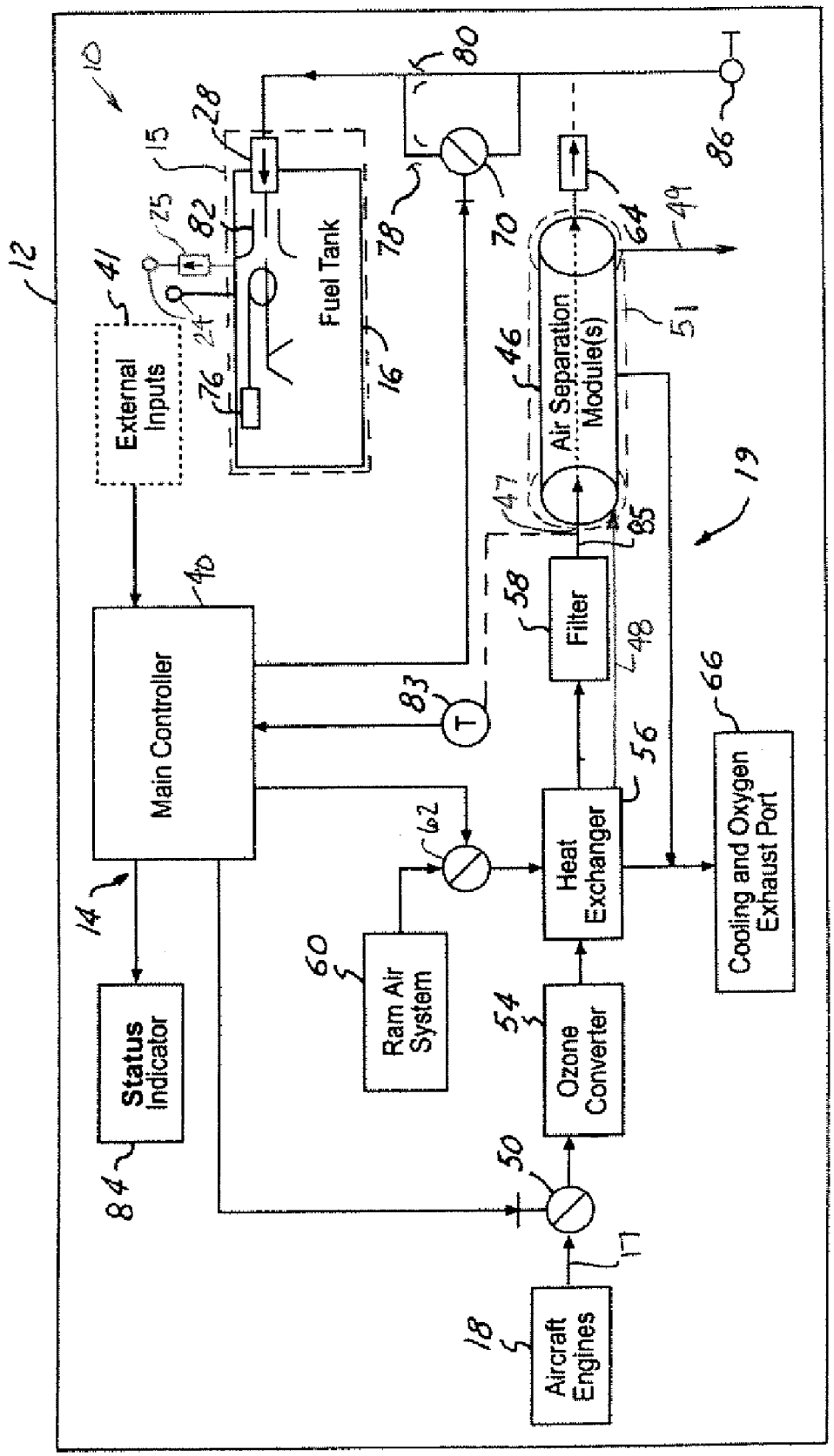
FIG. 1 is a block diagrammatic and schematic view of an on-board inerting system for an aircraft in accordance with an embodiment of the present invention.

In each of the following figures, the same reference numerals are used to refer to the same components. While the present invention is described with respect to a system and method for supplying inerting gas to center fuel tanks during ground and/or flight conditions of an aircraft, the present invention may be adapted for various inerting system applications known in the art.

In the following description, various operating parameters and components are described for one constructed embodiment. These specific parameters and components are included as examples and are not meant to be limiting.

Referring now to FIG. 1, a block diagrammatic and schematic view of an on-board inerting system 10 for an aircraft 12 in accordance with an embodiment of the present invention is shown. The inerting system 10 includes an on-board inerting control circuit 14, which controls supply of inerting gas to one or multiple fuel tank circuits 15 (only one is shown). The control circuit utilizes engine bleed air 17 from one or more aircraft engines 18 in supplying the inerting gas. The inerting system 10 also includes an air manipulation and separation circuit 19, which supplies inerting gas to the tanks 16.

It has been determined for commercial applications that maintaining oxygen content at or below 12% within the fuel tanks 16 is sufficient in minimizing potential for flame initiation therein. The system 10 is sized to maintain oxygen content within the fuel tanks 16 at approximately 12% or less for the majority of commercial aircraft flight conditions and in so doing is able to minimize weight, size, cost, and operational performance affect on the aircraft 12, while maximizing reliability. This is explained in further detail below.

The inerting system 10 may be primarily located within an air conditioning pack bay, in adjacent wing fairing areas, or in other suitable areas of the aircraft 12.

Although, a single inerted fuel tank 16 is shown, the aircraft 12 may have any number of fuel tanks, including center and wing fuel tanks. The fuel tanks may be of various size and shape and be located in various locations on the aircraft 12. The fuel tanks 16 may be adjacent to an environmental control system (not shown) for controlling parameters, such as humidity, cabin air pressure, and rate of change of cabin air pressure.

The control circuit 14 includes a main controller 40 that adjusts flow of the bleed air through one or more air separation modules (ASMs) 46 to the fuel tanks 16, by the control circuits 15, depending upon phase of flight. In receiving air at a rate sufficient to maintain the inert level of the tank below 12% for most flight conditions, the use of storage tanks to store inerting gas is eliminated, unlike that of prior art systems. The inerting gas may be in the form of nitrogen-enriched air (NEA) or in some other form known in the art.

Vents 24 are provided for limiting pressure within the fuel tanks 16. Although a dual vent is shown, any number of vents may be used, including climb vents and dive vents. To prevent leakage of inerting gas and to maintain a consistent oxygen level in the fuel tanks 16, a check valve 25, or equivalent device, is installed in one of the vents 24. The check valve 25 is used to prevent cross-flow and maintain proper oxygen levels in the tanks 16 by preventing leakage of inerting gas.

The controller 40 modulates the cooling airflow and/or bleed air flow to maintain ASM temperature at an optimum performance level. The controller 40 may modulate inerting gas flow during both flight and ground conditions. The controller 40 may also deactivate portions or all of the system 10 during over temperature or inappropriate operation conditions, which is further described below.

The controller 40 may be microprocessor based such as a computer having a central processing unit, memory (RAM and/or ROM), and associated input and output buses. The controller 40 may be an application-specific integrated circuit or may be formed of other logic devices known in the art. The controller 40 may be a portion of a central vehicle main control unit, an interactive vehicle dynamics module, or may be a stand-alone controller as shown. The controller may have external inputs 41.

The controller 40 also may provide a function status of the system 10 using an external or flight deck status indicator 84. The indicator 84 may include LED(s), light(s), an alphanumeric display system, status message(s) to other aircraft systems, or other indicator known in the art. The indicator 84 may supply system status signals, signals indicating that a component or system is operating inappropriately, or other signals providing inerting system relevant information.

The ASMs 46 may be of various sizes and styles and have various weights. The present invention minimizes size and weight of the ASM(s) 46 by maintaining oxygen content within the fuel tanks 16 to be approximately equal to or less than 12% for the majority of commercial flight conditions, as opposed to prior art systems that maintain oxygen content levels at 9% or less. By maintaining the oxygen content below a higher percentage the amount of inerting gas utilized by the system 10 is decreased, thereby decreasing size and weight of the system 10. Although a single air separation module is shown additional air separation modules may be utilized.

When one or multiple ASMs are utilized they may be enclosed in a shroud, such as shroud 51. The heat exchanger ram air is heated by the incoming feed or bleed air and the heated ram air exhaust can be ducted into the shroud 51, as designated by arrow 48. Oxygen-enriched air (OEA) can be directed into the shroud 51 mixing with the ram air exhaust. The combined oxygen-enriched air and ram air exhaust is vented overboard, as represented by arrow 49. The ram air exhaust heats the ASMs, thereby, minimizing bleed air/NEA cooling and associated potential condensation of hydrocarbon vapors into liquid form, which reduce ASM performance. OEA designated ducts are not required and the OEA is diluted with ram exhaust air to minimize any hazard associated with the OEA. The heating of the ASMs, such as during climb and cruise modes of operation, increases ASM performance during descent of the aircraft 12.

The separation circuit 19 receives bleed air 17 from the engines 18 via a bleed valve 50, which is used to control the supply of pressurized air to an ozone converter 54 or to the heat exchanger 56, when an ozone converter is not utilized. The heat exchanger 56 receives pressurized air from the ozone converter 54 and cools air from a ram air system 60. Air received from the ram air system 60 is controlled via a ram air valve 62. Air flows then through a filter 58 to the ASM(s) 46.

The ram air system 60 may be a portion of an on-board air-conditioning ram air system, a dedicated ram air system, or some other ram air system known in the art. The ram air system 60 may include a ram air scoop (not shown).

The ASM(s) 46 separate the pressurized air into inerting gas and oxygen-enriched air. The inerting gas is passed through a main check valve 64 to prevent reverse flow of the fuel from entering the ASM(s) 46. Upon exiting the main check valve 64 the inerting gas is passed to the fuel tanks 16.

The volume of inerting gas, is controlled via a flow rate control valves 70 and flow orifices 78 and 80. The inerting gas upon passing through the flow control orifices 78 and 80 pass through the check valve(s) 28 and then the float valve(s) 76 before being released into the fuel tanks 16. Although two orifices are shown, single, multiple, or continuously variable flow orifices may be used.

One or more witness drain and test port(s) 86 is coupled to the system 10, such as to verify the function of check valve 28, and to allow for functional checks on the ground. Of course, other test ports and check devices may also be incorporated within the system 10.

Figure 2:
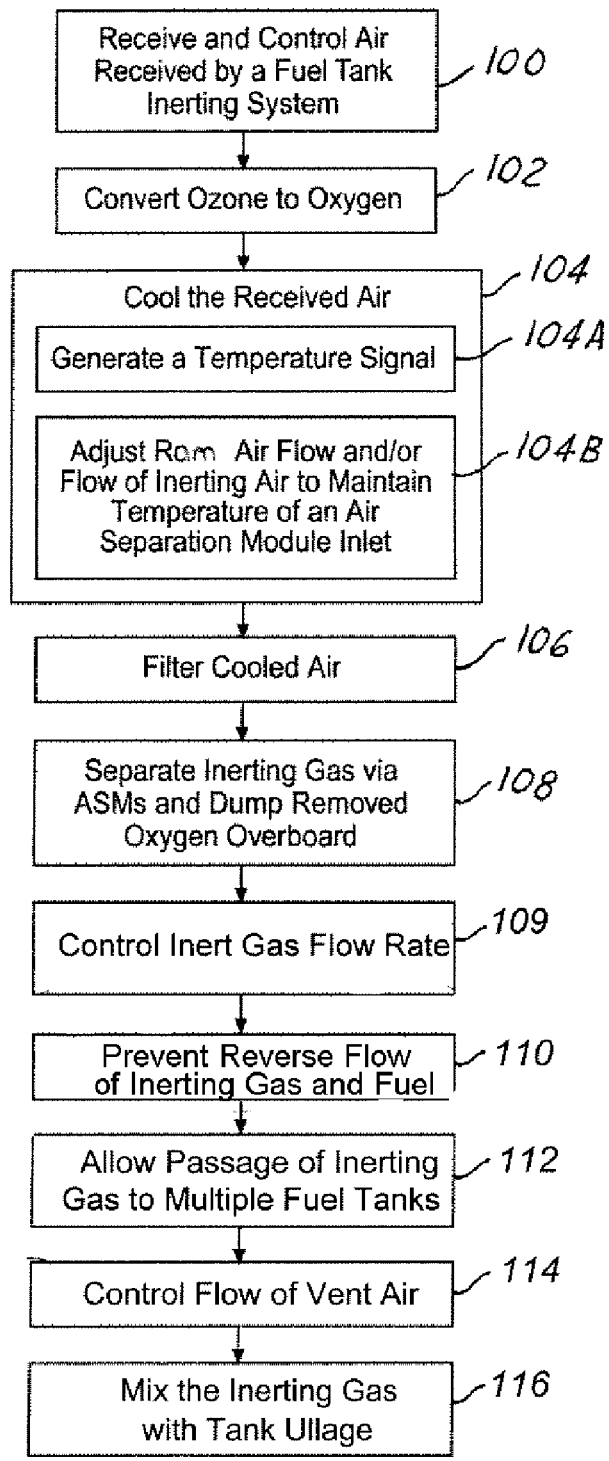
FIG. 2 is a logic flow diagram illustrating a method of supplying inerting gas to multiple fuel tanks of the aircraft in accordance with an embodiment of the present invention.

Referring now also to FIG. 2, a logic flow diagram illustrating a method of supplying inerting gas to the fuel tanks 16 in accordance with an embodiment of the present invention is shown. The following method is described with respect to the controller 40 maintaining oxygen content within the fuel tanks 16 to be at or less than approximately 12% during both ground and flight operating conditions. The method also maintains inert levels before and after landing the aircraft 12 such that the system 10 may be disabled some or all of the time when the aircraft 12 is parked. The method may be easily modified to attain other oxygen content levels.

In step 100, the bleed air valve 50 receives the bleed air from the engines 18 or from other pressurized air sources. The controller 40 controls flow of the bleed air by the position of the bleed air valve 50. In step 102, the ozone converter 54 converts ozone to oxygen. The ozone converter 54 converts ozone ($O_3$) to oxygen ($O_2$), to improve life and reliability of the ASM(s) 46.

In step 104, the pressurized air is cooled within the heat exchanger 56 by thermal energy transfer to the ram air. In step 104A, a temperature sensor 83 generates a temperature signal. The temperature sensor 83 is coupled to the controller 40 and to an air flow line, such as line 85, and generates the temperature signal that is indicative of the temperature of the air downstream of the heat exchanger 56. In step 104B, the controller 40 in response to the temperature signal adjusts ram airflow and/or bleed air flow to control temperature at the ASM inlet 47. When the ram air cooling system 60 is saturated at full available cooling or when inappropriate operating conditions exist that can limit ram air cooling, the controller 40 shuts down the system 10 to protect the ASM(s) 46 from unacceptably high temperatures.

In step 106, the filter 58 filters the cooled pressurized air. The filter 58 removes particles, water vapor, hydrocarbon gases and other contaminates from the high-pressure air before entrance to the ASMs 46.

In step 108, the ASMs 46 separate the cooled bleed air, into inerting or nitrogen-enriched air and oxygen-enriched air. The oxygen-enriched air is piped overboard and released out a cooling and oxygen exhaust port 66. Ram air is also exhausted from the heat exchanger 56 out the exhaust port 66 either directly or via the shroud 51, as shown. The inerting gas is permitted to pass to the main check valve 64. When multiple ASMs are utilized, this separation may be performed in parallel via the control valves 70.

In step 109, the inert gas flow rate is modulated. The controller 40 may regulate the inert gas flow to be lower during climb and/or cruise and higher during descent of the aircraft 12. In step 110, the main check valve 64, the fuel tank check valves 28, and the float valves 76 prevent reverse flow of the inerting gas, thus preventing fuel from flowing back to the ASM(s) 46. In step 112, the main check valve(s) 64 allows the inerting gas to pass from the ASM(s) 46 to the fuel tanks 16.

In step 114, the check valve 25 controls the flow of vent air within the fuel tanks 16. In step 116, the inerting gas is mixed with the tank ullage. The inerting gas is routed in the tanks 16 through an ejector 82, which utilizes the inerting gas flow to induce addition flow in the tanks 16, to mix the inerting gas with the tank ullage to minimize oxygen content variations in the tanks 16.

The above-described steps are meant to be an illustrative example; the steps may be performed synchronously, sequentially, simultaneously, or in a different order depending upon the application.

The present invention provides a system that has a compact, lightweight, reliable design that is practical to retrofit within an aircraft, or incorporate in initial production. The present invention minimizes size, weight, and system complexity by minimizing component redundancy therein while maintaining inert states within otherwise high flammability fuel tanks of an aircraft. The present invention has significantly reduced maintenance relative to its military predecessors.

The above-described apparatus and method, to one skilled in the art, is capable of being adapted for various applications and systems known in the art. The above-described invention can also be varied without deviating from the true scope of the invention.

What is claimed is:

1. An inerting system comprising:
    an air source supplying pressurized air;
    at least one fuel tank circuit associated with at least one fuel tank;
    a heat exchanger cooling said pressurized air;
    at least one air separation module in communication with said heat exchanger and separating inerting gas from said pressurized air;
    a controller controlling flow rate of said inerting gas;
    an ozone converter converting ozone contained within said pressurized air to oxygen; and
    a temperature sensor coupled to an air flow line and generating a temperature signal, said controller adjusting ram air flow through said heat exchanger in response to said temperature signal.

2. A system as in claim 1 further comprising
    a bleed air outlet in fluid communication with said heat exchanger, wherein said heat exchanger receives said pressurized air front said bleed air outlet.

3. A system as in claim 1 further comprising a ram air inlet supplying cool air to said heat exchanger.

4. A system as in claim 3 wherein said ram air inlet receives ram air from a ram air system.

5. A system as in claim 1 further comprising
    a filter in fluid communication with said heat exchanger and filtering at least a portion of said pressurized air.

6. A system as in claim 1 further comprising a main check valve fluidically coupled between said at least one air separation module and said at least one fuel tank and preventing reverse flow of said inerting gas or fuel.

7. A system as in claim 1 wherein said at least one fuel tank circuit comprises at least one flow rate control valve and orifice, said controller coupled to said at least one control valve and altering flow of said inerting gas to said fuel tanks.

8. A system as in claim 1 wherein said at least one fuel tank circuit comprises at least one check valve for preventing reverse flow of fuel.

9. A system as in claim 1 wherein said at least one fuel tank circuit comprises at least one float valve for preventing reverse flow of said inerting gas.

10. A system as in claim 1 wherein said at least one fuel tank has a common air vent.

11. A system as in claim 1 wherein said at least one fuel tank is dual-vented.

12. A system as in claim 1 wherein said at least one fuel tank has at least one associated vent check valve, said at least one associated vent check valve controlling airflow through said at least one associated vent.

13. A system as in claim 1 wherein the inerting system maintains oxygen content level within said at least one fuel tank to be approximately 12% or less.

14. A system as in claim 1 wherein said controller utilizes low-flow bleed air during at least one of mode selected from a climb mode and a cruise mode of an aircraft.

15. A system as in claim 1 wherein said controller modulates ram airflow to maintain inlet temperature of said at least one air separation module.

16. A system as in claim 1 wherein said at least one air separation module in separating inerting gas from said pressurized air separates nitrogen-enriched air from said pressurized air.

17. A system as in claim 1 wherein said controller operates in at least one inerting system mode.

18. A system as in claim 1 further comprising an ejector within at least a portion of and mixing said inerting gas with other gases in said at least one fuel tank, the ejector using motive flow of said inerting gas to cause said mixing.

19. A system as in claim 18 wherein said ejector circulates gases in said at least one fuel tank.

20. A system as in claim 1 wherein said at least one fuel tank is a center tank.

21. An inerting system comprising:
an air source supplying pressurized air;
at least one fuel tank circuit associated with at least one fuel tank;
a heat exchanger cooling said pressurized air;
at least one air separation module in communication with said heat exchanger and separating inerting gas front said pressurized air, said at least one air separation module at least partially enclosed by at least one shroud that is receiving exhaust air; and
a controller controlling flow rate of said inerting gas.

22. A method of designing an aircraft inerting system that supplies inerting gas to at least one fuel tank of an aircraft comprising:
receiving pressurized air;
cooling said pressurized air;
separating inerting gas from said pressurized air; and
controlling flow of said inerting gas from at least one air separation module to the at least one fuel tank to maintain oxygen content level in the at least one fuel tank at or below approximately 12% for a majority of flight conditions and to allow said oxygen content level to exceed approximately 12% for a minority of said flight conditions.

23. A method as in claim 22 further comprising utilizing low-flow bleed air during at least one of mode selected from a climb mode and a cruise mode of the aircraft.

24. A method as in claim 22 further comprising modulating ram airflow to maintain inlet temperature of at least one air separation module.

25. A method as in claim 22 wherein said inerting gas is supplied to the at least one fuel tank when the aircraft is on the ground.

26. A method as in claim 22 wherein said inerting gas is supplied to the at least one fuel tank when the aircraft is in flight.

27. A method as in claim 22 further comprising operating in multiple inerting system modes.

28. A method as in claim 22 further comprising circulating gases in said at least one fuel tank.

29. An inerting system for an aircraft comprising:
at least one fuel tank circuit having at least one fuel tank;
a bleed air source;
a heat exchanger in fluid communication with and receiving pressurized air from source, said heat exchanger cooling said pressurized air;
at least one air separation module in fluid communication with said heat exchanger and separating inerting gas from said pressurized air;
a main check valve fluidically coupled between said at least one air separation module and said at least one fuel tank and preventing reverse flow of said inerting gas;
an ejector within at least a portion of and using inerting gas flow to significantly mix said inerting gas with other gases in and throughout said at least one fuel tank; and
a controller controlling flow of said inerting gas from said at least one air separation module to said at least one fuel tank to minimize exposure to oxygen content levels greater than approximately 12%.

30. An aircraft inerting system for an aircraft comprising:
an air source supplying pressurized air;
at least one fuel tank;
an air manipulation and separation circuit having at least one air separation module and separating inerting gas from said pressurized air;
an ejector within at least a portion of and using motive flow of said inerting gas to mix said inerting gas with other gases in said at least one fuel tank; and
a controller controlling oxygen content level within said at least one fuel tank.

31. A system as in claim 30 further comprising a heat exchanger cooling said pressurized air.

32. A system as in claim 30 wherein said ejector is within at least a portion of and circulates fluid flow in at least one center fuel tank.

33. A system as in claim 32 further comprising a bleed air outlet in fluid communication with said heat exchanger, wherein said heat exchanger receives said pressurized air from said bleed air outlet.

34. A system as in claim 32 further comprising a ram air inlet supplying cool air to said heat exchanger.

35. A system as in claim 30 further comprising an ozone converter converting ozone contained within said pressurized air to oxygen.

36. A system as in claim 30 wherein said at least one fuel tank circuit comprises at least one float valve for preventing reverse flow of said inerting gas.

37. A system as in claim 1 wherein said controller controls said flow rate in response to a plurality of inputs including phase of aircraft flight and an inerting system temperature.

38. A method as in claim 22 further comprising:
minimizing exposure to oxygen content levels greater than approximately 12% within said at least one fuel tank; and
minimizing at least one of size of system components, weight of system components, and system complexity while maintaining said exposure.

39. A method as in claim 22 wherein controlling said flow comprises adjusting said flow in response to a plurality of inputs including phase of aircraft flight and an inerting system temperature.

* * * * *